June 23, 1959 L. HASCHEK 2,891,314
MAP ASSEMBLY INCLUDING LOCATION DIRECTOR
Filed Oct. 4, 1956 2 Sheets-Sheet 1
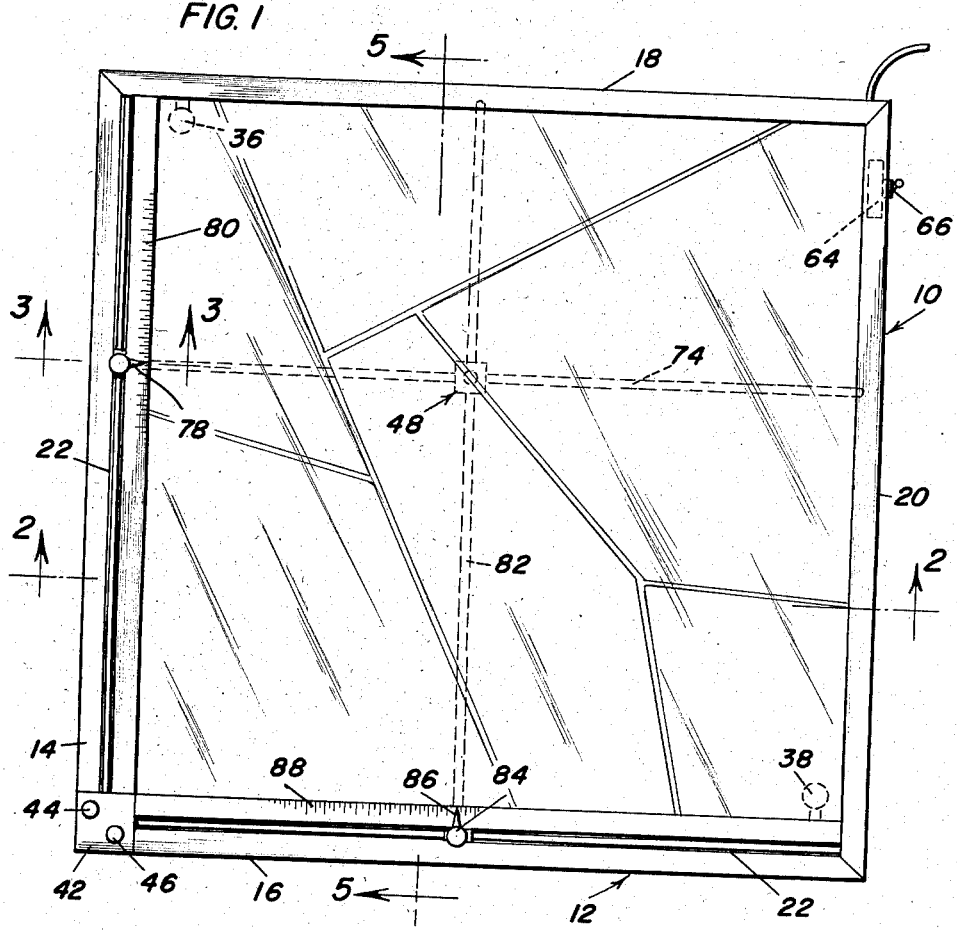
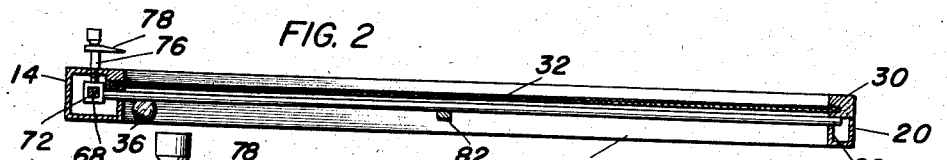
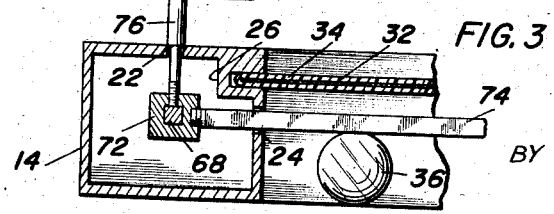
Leo Haschek
INVENTOR
BY Samuel Meerkreebs
ATTORNEY

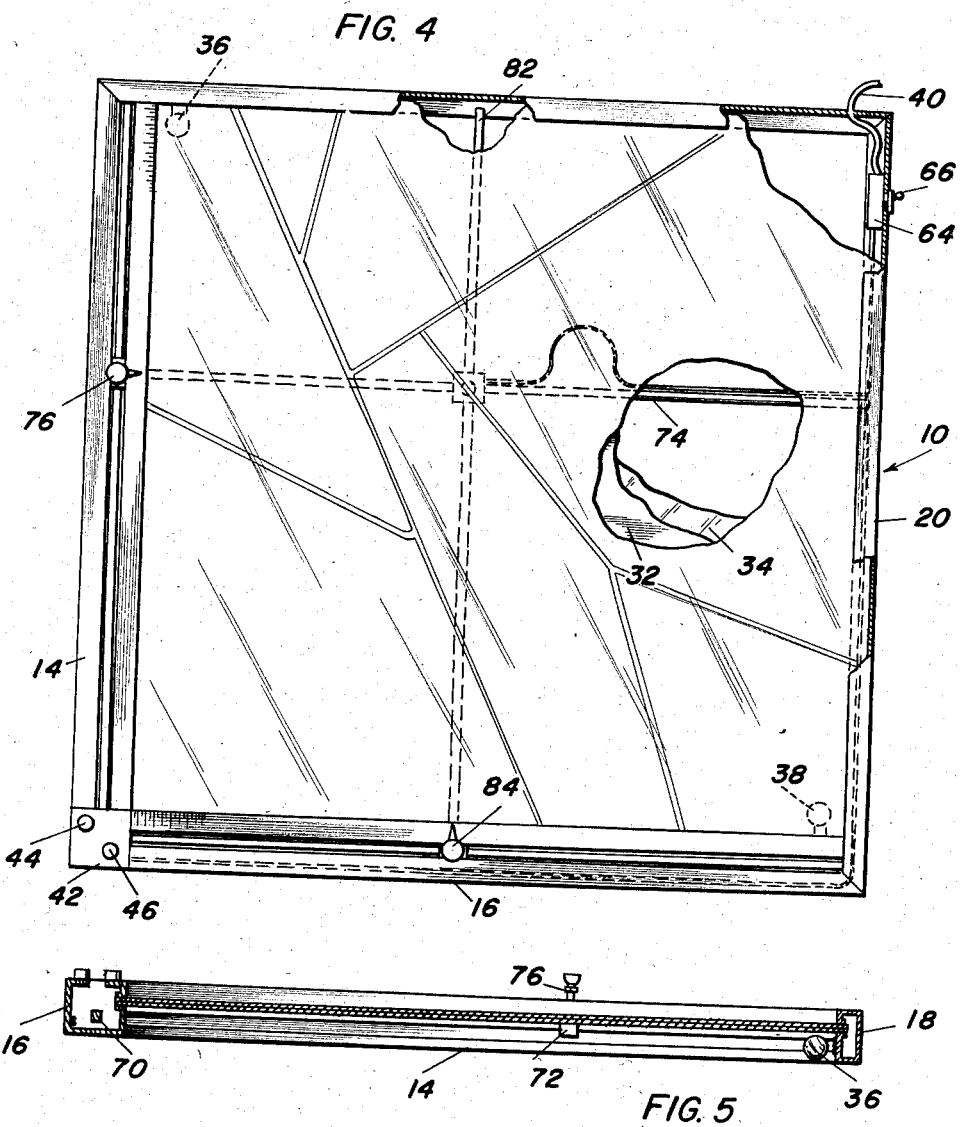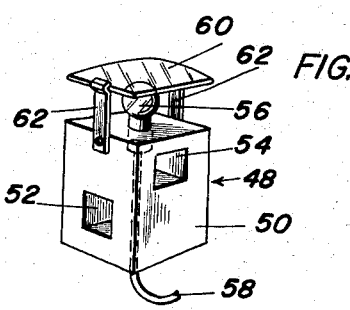

United States Patent Office 2,891,314
Patented June 23, 1959

2,891,314

MAP ASSEMBLY INCLUDING LOCATION DIRECTOR

Leo Haschek, Toronto, Ontario, Canada

Application October 4, 1956, Serial No. 613,998

2 Claims. (Cl. 33—1)

This invention relates in general to new and useful improvements in maps, and more specifically to an improved map assembly which includes a position locator.

Heretofore maps have generally been folded up and when it is desired to find a location on the map, it is necessary for one to first unfold the map so that they can see the general area in which you are interested and then to either attempt to follow the guide marks on the sides of the map or to merely hunt at random to find the location in which they are interested. This is time-consuming and also troublesome, particularly when seated in an automobile, furthermore the map readily deteriorates when used in this manner.

It is therefore the primary object of this invention to provide an improved map assembly which includes a supporting frame for firmly supporting a map and a location director means carried by a supporting frame for pinpointing a location on a map utilizing the coordinates of the map.

Another object of this invention is to provide an improved map assembly which includes a supporting frame having mounted therein a map, the map being substantially a transparent cover, there being mounted for movement beneath the map a location spotlight, the spotlight being so mounted whereby it may be readily positioned according to coordinates of the map to indicate a general location.

Still another object of this invention is to provide an improved map assembly which may be readily utilized in an automobile, to be retained in a flat or unfolded condition so that it may be stored either under a vehicle seat or under the instrument panel thereof, the frame of the map assembly supporting a map in a flat state at all times, so that indicia thereon may be readily found.

A further object of this invention is to provide an improved map assembly which includes a supporting frame having mounted therein a map mounted in a transparent case, the supporting frame having two adjacent sides thereon, provided with coordinates for locating positions on the map, there being adjustably carried by the two sides of the frame support members having corners for locating the support members in conjunction with the coordinates, and there being carried by the support members a spot illuminating device for illuminating a general area of the map on which a desired location is to be found.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a plan view of the map assembly which is the subject of this invention and shows generally the outline thereof;

Figure 2 is a transverse vertical sectional view taken substantially on the plane indicated by the section line 2—2 of Figure 1, and shows a general cross section of the map including the specific cross section of a pair of the frame members and the mounting of a support member relative to one of the frame members;

Figure 3 is an enlarged fragmentary sectional view taken substantially on the plane indicated by the section line 3—3 of Figure 1 and shows further the details of the mounting of the support member and the relationship thereof with respect to one of the frame members;

Figure 4 is a plan view of the map of Figure 1 similar to Figure 1 with portions of the frame and the map being broken away and shown sectionally to clearly illustrate the details of the map assembly;

Figure 5 is a transverse sectional view taken substantially on the plane indicated by the section line 5—5 of Figure 1 and shows further the details of the map assembly; and Figure 6 is an enlarged perspective view of the location director of the map assembly.

Referring now to the drawings in detail it will be seen that there is illustrated a map assembly which is the subject of this invention, the map assembly being referred to in general by the reference numeral 10. The map assembly 10 includes a supporting frame which is referred to in general by the reference numeral 12. The frame 12 includes a pair of side frame members 14 and 16 which are adjacent to each other and also includes a pair of side frame members 18 and 20 which are also located adjacent to each other. Frame members 14, 16, 18 and 20 are preferably of the same widths so that the frame 12 is of a square configuration. The frame members 14, 16, 18 and 20 are suitably secured together at the corners of the frame 12 in any desired manner.

As is best illustrated in Figures 2 and 3, the frame members 14 and 20 are channel shaped in cross section, the frame member 14 being wider than the frame member 20, but being of the same type. Frame member 14 is provided at its upper side with an elongated slot 22 which extends almost the whole length thereof. Frame member 14 is also provided at its inner side with an elongated slot 24. Further, the frame member 14 is provided with a U-shaped portion 26.

Frame member 20 is provided at its inner side with an elongated slot 28. Also, the upper inner part thereof includes a U-shaped portion 30, the U-shaped portion 30 opposing the U-shaped portion 26 of the frame member 14.

Frame members 16 and 18 are identical in cross section with the frame members 14 and 20 respectively. Accordingly, further description of these frame members is not believed to be necessary.

Carried by the U-shaped portion 26 of the frame members 14 and 16 and the U-shaped portions 30 of the frame members 18 and 20 is a map 32. The map 32 is preferably formed of thin paper or other translucent material and is encased in a plastic casing 34. Of course it will be readily apparent that the map 32 will be supported in a flat state at all times for ready observation.

In order that the map 32 may be suitably illuminated, there is disposed at the intersection of the frame members 14 and 18 on the under side of the map 32 an illuminating lamp 36. A similar illuminating lamp 38 is disposed beneath the map 32 at the corner defined by the intersection of the frame members 16 and 20. Connected to the lamps 36 and 38 is an electric wire 40 which may be connected to the electrical system of the vehicle, for example, in which the map assembly 10 is positioned.

Disposed at the intersection of the frame members 14 and 16 is a plate 42 on which there is mounted a pair of switches 44 and 46. The switch 44 is operatively connected to the electrical sockets of the lamps 36 and 38 for controlling the operation thereof.

In order that a point of location on the map 32 may be readily located, there is provided a location director which is referred to in general by the reference numeral 48 and which is best illustrated in Figure 6. The location director 48 includes a mounting block 50 which is square in cross section and which is vertically elongated. The mounting block 50 is provided with a first transverse bore 52 and a second transverse bore 54. The transverse bores 52 and 54 are square in cross section and are disposed at right angles to each other.

Carried by the mounting block 50 in the upper side thereof is a lamp 56 which has connected thereto a wire 58. The wire 58 is in turn connected to the wire 40 through the switch 46 which controls the illumination of the lamp 56.

In order that the lamp 56 may pinpoint a location on the map 32, there is mounted above the lamp 56 a suitable overlying lens 60. The lens is carried by a pair of supports 62 which extent upwardly from the mounting block 50.

At this time it is pointed out that the electrical circuit of the map assembly 10 also includes a flashing unit 64 which may be used to interrupt the current directed to the lamps 36, 38 and 56. The flashing unit 64 is controlled by means of a switch 66, carried by the frame member 20 in which the flashing unit 64 is mounted.

Extending longitudinally of the frame members 14 and 16 within the confines thereof are elongated track members 68 and 70, respectively. The track members 68 and 70 are square in cross section and are identical with the exception of the fact that the track member 68 is disposed closer to the upper part of the frame 12 than the track member 70.

Mounted on the track member 68 is a guide block 72 which in turn supports a support member 74, the support member 74 extending transversely of the frame 12 beneath the map 32 and having its opposite ends supported by a part of the frame member 20. Extending upwardly from the guide block 72 is a pointer assembly 76 which includes a pointer 78. The upper surface of the frame member 14 is provided with a scale 80 in the form of coordinates of the map 32. Thus by utilizing the pointer 78, a desired location north and south on the map 32 may be readily located.

Carried by the track member 70 is a support member 82. The support member 82 is mounted on the track member 70 in the same manner described with respect to support member 74. Also, the support member 74 has associated therewith a pointer assembly 84 which includes a pointer 86. The pointer 86 is associated with a scale 88 formed in the upper surface of the frame member 16, the scale 88 being in the form of coordinates of the map 32. The support member 82 is used to locate a position east and west on the map 32.

The support member 74 freely passes through the opening of bore 54 of the mounting block 50. The support member 82 freely passes through the opening 52 of the mounting block 50. Thus, when the support member 82 is moved left and right, the mounting block 50 is moved along the support member 74. The other end, in the support member 74 is moved between the frame members 16 and 18, the mounting block 50 is moved along the support member 82. Through the relationship between the mounting block 50 and the support members 74 and 82, it will be readily apparent that the lamp 56 may be positioned under any desired portion of the map 32 utilizing the coordinates of the scales 80 and 88.

From the foregoing description of the map assembly 10, it will be readily apparent that there has been devised a map assembly which may be very useful in locating buildings and the like in cities or other areas where the exact position of the desired location is not known, but which may be found readily located by utilizing known map coordinates. Further, the map assembly 10 is provided with its own lighting system so it may be readily used both in the daytime and night time and because of the arrangement of the lamps of the map assembly, the light from the map assembly in no way interferes with the ability of the operator of the vehicle to drive. It is to be further realized that the map assembly 10 is relatively flat and may be readily stored in any desired position within the vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A map assembly comprising a portable open rectangular support frame comprising pairs of right angularly related frame members, at least two adjacent frame members comprising hollow channel members, said frame including aligned opposed grooves in said frame members defining a rectangular recess groove about the inner periphery of said frame, a flexible light-penetrable map peripherally and removably supported in said rectangular recess groove each of said adjacent hollow channel members including therein longitudinally extending track members having a rectangular cross section, said track members being disposed beneath the recessed groove of the frame, one of said track members being above the other, upwardly opening slots in said hollow channel members overlying said track members, a pair of guide blocks including a transverse rectangular bore, one of each of said guide blocks being reciprocably received on one of said track members, each guide block including a vertically extending portion extending through the slot of a respective channel member and terminating in a pointer portion for traversing the length of the channel member, a coordinate indicia scale along the upper surface of said channel members for alignment with said pointer portion, said channel members including a longitudinal slot in the side thereof and opening toward an opposed parallel side frame member, said longitudinal slots in the sides of said channel members being in alignment with the track members in the respective channel members, said opposed parallel side frame members including an elongated groove in alignment with the longitudinal slots in the sides of a respective channel member, rectangularly cross sectioned elongated support members secured to one of said guide blocks for movement therewith along said track members, the other end of said elongated support members being slidably received in the elongated groove of the parallel side frame members, and a location director comprising a mounting block including right-angularly related overlying transverse bores having a rectangular cross section, said elongated support members extending through one of said right-angularly related transverse bores of said mounting block whereby movement of said guide blocks on its respective track member results in similar movement of the mounting block relative to one of said elongated support members, said location director including upwardly directed illuminating and lens means for concentrating light rays at a particular location and projecting the same through the light-penetrable map.

2. In a map assembly as set forth in claim 1 in which said flexible and light-penetrable map comprises a translucent sheet element including geographic indicia thereon, and a flexible transparent sheath enclosing said translucent sheet element.

References Cited in the file of this patent

UNITED STATES PATENTS

| | | |
|---|---|---|
| 2,375,427 | Mannino | May 8, 1945 |
| 2,600,484 | Copping | June 17, 1952 |
| 2,612,627 | Straney | Sept. 30, 1952 |
| 2,771,593 | Straehl | Nov. 20, 1956 |

FOREIGN PATENTS

| | | |
|---|---|---|
| 337,445 | Germany | May 31, 1921 |
| 179,524 | Great Britain | Sept. 14, 1922 |